(12) United States Patent
Batrac

(10) Patent No.: US 8,639,059 B2
(45) Date of Patent: Jan. 28, 2014

(54) METHOD FOR LOSSLESS DIGITAL SHEARING AND ROTATION WITH FINE ANGULAR INCREMENTS

(76) Inventor: Andrew Batrac, Dee Why (AU)

( * ) Notice: Subject to any disclaimer, the term of this patent is extended or adjusted under 35 U.S.C. 154(b) by 372 days.

(21) Appl. No.: 12/920,217

(22) PCT Filed: Feb. 10, 2010

(86) PCT No.: PCT/IB2010/050616
§ 371 (c)(1),
(2), (4) Date: May 10, 2011

(87) PCT Pub. No.: WO2011/007265
PCT Pub. Date: Jan. 20, 2011

(65) Prior Publication Data
US 2011/0221778 A1    Sep. 15, 2011

(51) Int. Cl.
*G06K 9/36* (2006.01)
*G06K 9/32* (2006.01)
*G09G 5/00* (2006.01)

(52) U.S. Cl.
USPC ........................... 382/280; 382/293; 345/649

(58) Field of Classification Search
USPC .................................................. 382/280, 293
See application file for complete search history.

(56) References Cited

U.S. PATENT DOCUMENTS

| 5,031,038 A * | 7/1991 | Guillemot et al. | 375/240.2 |
| 2006/0133683 A1* | 6/2006 | Srinivasan | 382/250 |

OTHER PUBLICATIONS

Andrew V. Batrac, "Multi-dimensional properties of One-dimensional discrete Fourier transform", Jan. 3, 2003. http://arxiv.org/ftp/math/papers/0301/0301017.pdf.*

* cited by examiner

*Primary Examiner* — Utpal Shah

(57) ABSTRACT

The present invention discloses methods for lossless shearing and/or rotation of two-dimensional (2D) data, including digital images, with minute discrete angular increments, carried out only by permutations in the Fourier frequency domain, by exploiting the natural shear occurring as a result of computing a single one-dimensional discrete Fourier transform (DFT) of 2D arrays. Rotations in general, especially for oblong arrays, occur on elliptical paths. Circular rotation, by an angle of arctan(1/width), is achieved on square arrays. When each dimension is multiple of a smaller N, the rotation/shear angle can be increased to arctan(2N/width). Rotation steps can be repeated in long, animation-like series, with neither loss nor degradation of the Fourier content; so much so that tracing the steps back does restore the original data with remarkable precision.

17 Claims, 4 Drawing Sheets

Centered Row Inversion

Shearing by arctan(2/Width)

| Original 2D array e.g. (4x5) | ABCD.EFGH.IJKL.MNOP.QRST |  |
|---|---|---|

| Step 1. Single 1D DFT $F(0)=a$ | abc defgh ijklm nopqr st |  |
|---|---|---|
| Step 2. Centered Row Inversion | abc nopqr ijklm defgh st |  |

| Step 3. Single Inverse* 1D DFT *Exponential term sign - same as in Step 1. | ABCD QRST MNOP IJKL EFGH |  |
|---|---|---|
| Step 4. Row Inversion | ABCD EFGH IJKL MNOP QRST |  |

Invention Map

METHOD FOR LOSSLESS DIGITAL SHEARING AND ROTATION WITH FINE ANGULAR INCREMENTS

TECHNICAL FIELD

The present invention relates in general to methods for digital image processing and computer graphics processing systems; more particularly—for lossless sub-pixel interpolations; more specifically—for lossless shearing and/or rotation of two-dimensional (2D) data, including digital images, producing rotations by small discrete angular increments, which on repetition can create the animation-like effect. Being intrinsically lossless, the invention allows the clockwise (CW) and counter-clockwise (CCW) routines to be reverse of each other, so that tracing back a number of forward steps does restore the original data.

BACKGROUND ART

Known literature contains a number of methods for rotating the digital images. One can roughly divide these methods into two categories. The first ones calculate rotations without any Fourier transformations, i.e. exclusively in the spatial domain, and usually by means of lossy interpolations. In the second category, the conventional (orthogonal) 2D discrete Fourier transforms (DFT) do get used, so that rotations are computed, partially or in full, in the Fourier frequency space, and usually with help of rotation or shear matrix operations, etc.

DISCLOSURE OF INVENTION

Technical Problem

By definition, the images rotated by an arbitrary angle (not 90 degree) contain the altered data. By a common notion, the alteration is always somewhat lossy, i.e. when one tries to rotate the altered data back to the original orientation, the resulting data are never exactly the same as the original. Often, rotated images are automatically enlarged, regardless of direction (CW or CCW), to accommodate for corner areas which usually move out of the original rectangle. When there is a need to investigate the data properties (e.g. image texture, etc.) at various rotation angles, one usually prefers to recalculate each rotation from the original dataset instead of re-using the rotated ones, in order to avoid any risk of accumulating errors.

The data preservation concerns are approached somewhat in e.g. <<Convolution-based interpolation for fast, high-quality rotation of images>>, Unser at al. IEEE Transactions on Image Processing, vol. 4, No. 10, October 1995, and also in U.S. Pat. Nos. 6,640,018 and 6,687,422; they do employ DFTs, which can in theory be used as means for lossless interpolations. However, those and other known solutions are rather too complex; they involve various multi-step and/or multi-stage techniques such as: convolutions, windowing, conventional (orthogonal) 2D DFTs, combined with rotation and/or shear matrix operations, some arbitrarily set variable values, image resizing or scaling. Each solution as a whole does not appear to be truly (losslessly) reversible. As a result, none of the known rotation methods has ever been declared as lossless, i.e. they cannot in general restore the original data precisely, by a reverse action.

Technical Solution

The present invention uses only two types of mathematical operations: DFTs and permutations. Both are known to be fully reversible, provided that the DFT routines have sufficient floating point precision, which is not a problem for modern computers. Thus, the invention offers a few of more or less simple sequences of steps, which do without any lossy interpolations, convolutions, matrix multiplications, etc. With every single step being precisely reversible, the proposed methods are truly lossless.

The method's simplicity comes from a formula that the present author discovered, or perhaps re-discovered, in 1999, and somewhat published in 2003 in the article titled <<Multidimensional properties of 1D DFT>> [ http://arxiv.org/abs/math/0301017].

The article, in short, teaches that:
given a rectangular (N*M) array of spatial data f(x,y), being presented as a 1D array f(k) having k=Ny+x;
which then gets undergone a DFT, resulting into a 1D array F(j);
which then is assumed to be renumbered into a transposed rectangle (M*N) having j=Mu+v;
then, finally, the formula states that the obtained 1D DFT array F(j) does at the same time represent a proper 2D DFT array indexed as F(u+v/M, v).

This means—the said 2D array is not orthogonal, but slightly skewed (sheared) in the frequency domain, by arctan(1/M). The present invention teaches how to exploit this peculiar frequency shear in order to achieve shearing and/or rotation in the spatial domain.

SUMMARY OF THE INVENTION

The present invention provides a number of novel techniques in areas of image analysis, image transformation, lossless sub-pixel interpolations, un-orthogonal Fourier transforms, and digital processing in general. The core novelties can be divided in two types:
1. Straight-forward lossless rotations (Claims 1 to 3), achieved without any intermediate stages (apart from the permutated DFT).
2. Fine (sub-pixel) lossless shearing (Claims 4 to 10), which then is used for:
   compound ("coarse") lossless shearing (Claims 11 to 12), which then is used for:
   compound lossless rotations (Claims 13 to 15) having one or two intermediate images.

The method's computing burden (execution times) is (able to be) reduced greatly by use of fast Fourier transforms (Claim 16), and further—by parallel computing (Claims 11 and 12) of image segments (strips), where multi-processor hardware is available.

In addition, a personal computer (PC) application employing the present invention, written and coded by the inventor, file named Batraction.exe (of circa 100 kilobytes)—is freely available for demonstration purposes, confidential until publication.

Common Terms And Conventions

Numeric format: The present invention assumes that the initial image data are prepared in the format, with the precision and size—suitable for the 1D DFT routine chosen (by the user), which computationally is the most complex operation used herein. All other steps of this invention are in essence just permutations, and as such they are easily adaptable to any numeric format. In general, the user can always prepare the input data with the desired precision and format, then pass it through the steps without any intermediary conversion. Therefore, any particular steps of altering format or precision are presumed to be redundant. During the procedure the user may wish to send copies of intermediate or output data either for storage, or to a monitor device, etc.; in general, this may require some format and/or precision conversions. Nonetheless, these are out of scope of this invention.

2D arrays (of image records, etc)—are in the standard layout, believed to be the most widely accepted and used, i.e. row by row, in a single continuous line of computer memory—without any interruptions, gaps, padding, etc. Therefore, there is no need in any steps of converting such arrays from 2D to 1D, and vice versa. Although for some proprietary image file formats, which use e.g. special row padding, compression, etc., some preparation processing may be required. Still, that is out of scope of this invention.

Indices (Axes): For the purpose of visualizing the permutations used in the present invention, the column index is assumed to increment horizontally from left to right, and the row index—upward. Following this convention, a wording like e.g. "array's upper half" shall mean "the half with the greater row indices". Some image file formats do not follow this convention, so please beware of possible confusion.

Transpose—is a standard permutation of 2D arrays, commonly known as flipping the rows and columns, or diagonal reflection.

Cyclic Shift—is a standard permutation wherein each element of a group (column, row) is shifted in place of its neighbor within the group. When the new location is out-of-bounds, it wraps around to the opposite end. For 1D arrays, of say length L, the phrase "cyclic shift by N elements" means that the two memory chunks of lengths N and (L-N) get swapped.

Wrap-around—occurs when the new location is out of bounds of the image array. Thus, e.g. the phrase "a column shifted 1 unit up" means that all but one elements are moved one unit up, and the topmost element moves to the bottom of the column. Likewise, a phrase "a row shifted 1 unit left" means that all elements but one are moved one unit leftward, and the left-most element moves to the right end of the row.

Center—is the geometrical center point of an image. It is defined conventionally, i.e. by the column index equal to half-width, and the row index equal to half-height of the image. Please note that Center divides the memory (1D) array into two generally unequal halves (although the equally divided halves are possible). Moreover, the Center's 1D offset may change after transposition. This is to be taken into account in the Centered Transpose step (Claim 1).

Pivot—is an arbitrary point in the original 2D image, around which the rotation is sought to occur.

F(0)—is the point containing the Fourier element with its index=0; also known as Zeroth element. Traditionally, both 1D F(0) and 2D F(0,0) Fourier elements are assumed to be found at the array origin. The present invention follows this convention. If user's DFT function did not, then a simple 1D offset correction (cyclic shift) would be needed.

Coarse Shearing—is well known, simple, rather primitive a technique of rounding off the fractional index values; It forgoes any sub-pixel calculations and shifts whole strips of data by 1 unit up or down relative to its neighboring strip.

Strip—is a part of the 2D image comprising either 2 or more neighboring columns (vertical strip), or 2 or more neighboring rows (horizontal strip). When each dimension is a multiple of N, the image may be divided into N vertical strips of same width, and N horizontal strips of same height. The present invention achieves the fine (sub-pixel) shear within each strip (Claims 4-7), and the coarse shear (Claim 8)—by simple cyclic shifts, by whole rows within each strip, depending on the strip ordinal number, which can be negative. The strip containing the pivot has its ordinal number=0, or possibly—minus one. Typically (Claim 11), the strips ought to be orientated vertically immediately before the fine shearing routine is performed.

Description of Special Terms

Single 1D DFT of 2D arrays (Batrac transform)—is the first essential element of the present invention. Its features are described in detail in <<*Multi-dimensional properties of 1D DFT*>> [http://arxiv.org/abs/math/0301017] by Batrac A V—the present author, who has previously had some difficulties in explaining that this is a new type of Fourier transforms, which will hopefully be mitigated by addressing it by the proper name. Conventionally, 2D arrays/images are passed for processing to a 2D DFT routine, along with other parameters such as image width and height. In the present invention the single memory line of 2D elements is passed to a 1D DFT routine along with the line length (i.e. image area) value. This results into a line of 1D Fourier frequency values (elements). However, as the author has shown, i.e. has proven mathematically, the output 1D frequency array at the same time is also a 2D frequency array. Its peculiar feature, being exploited herein, is a non-integer, fractional index exhibiting a minute natural shear (slant, skew). One can visualize a 2D array produced by the single 1D DFT as having its columns upright but the rows slanted, sloping slowly uphill from left to right.

Frequency Axes: Traditionally spatial rows are assumed to correspond to frequency rows; likewise the columns. E.g. an oblong landscape-orientated image is expected to have the Fourier array of the same landscape orientation. Please beware that the present invention does not follow the tradition, but promotes the opposite notion. Due to peculiarity of the DFTs used, the output DFT arrays here are stored transposed, which the present invention accepts as natural and correct. If one should prefer the traditional orientation, then an additional transpose would be needed. The latter, nonetheless, is redundant and practically useless—if we simply agree to remember that spatial rows (herein at least) are to correspond to frequency columns, and vice versa.

Centering—is a 1D cyclic shift that moves F(0) from its normal position (usually the origin) into the 2D Center (Claim 1). Its reverse—"un-centering" shift—moves F(0) from the Center to the normal position.

Levelling—is an original technique that represents the operation of rounding the non-integer indices up or down to the nearest integer value. In practice this means that elements with rounded-up indices get cyclicly shifted up (1 unit) along the axis, and elements with rounded-down indices stay undisturbed. It is in a way a coarse shear. Usually a 2D array produced by 1D DFT needs its "sloping" rows to be levelled (hence the name hereafter).

Un-levelling—is the reverse shift. Algebraically it represents the step of un-rounding the previously integer indices in order to make them fit the slanted (non-integer) grid of the 1D DFT array.

Double-Shear Transpose—is an original technique that combines a transpose with the two shifts (levelling and un-levelling). The desired outcome can be achieved in a number of ways. The actual sequence of these sub-steps is not essential, as long as the desired re-arrangement is obtained. One of the possible sequences is as follows:

Level the rows (shift the array's right-hand half up one unit);
Transpose;
Un-level the rows (shift the right-hand half down one unit);
Another equivalent sequence:
Level the rows (shift the right-hand half up);
"Un-level" columns (shift the upper half left);
Transpose.

Yet another equivalent sequence:
Transpose;
"Level" columns (shift the upper half right);
Un-level rows (shift the right-hand half down).

Centered Transpose—is an original technique that achieves the outcome identical to the Double-Shear Transpose. Instead of 2D it uses simpler 1D cyclic shifts as follows: centering; transpose; un-centering. Please note, for oblong images especially: Transpose in general alters the Center offset, so the reverse (un-centering) shift is not necessarily of the same offset as the forward one.

Pivot-to-F(0)—is a 1D cyclic shift. It is required (Claim 2) in spatial domain when the Pivot's and the F(0) element's offsets differ. In the frequency domain the pivot may be nothing but F(0). However, in the spatial domain the present invention allows any point in the image to be the pivot. Normally, in a scientific task, one would desire the Pivot to be exactly at the Center. Yet, in the field of entertainment, or special effects, the ability to set the Pivot at any point, and later to re-assign it over to any other point, may prove itself useful. Please note, that the core rotation method (Claim 1) returns the data transposed, and the Pivot offset value—changed, so the reverse (F(0)-to-Pivot) shift is not necessarily of the same value as the forward one.

2D DFT—as used in Claims 4 and 5, is of a "reduced" version. Traditionally a 2D DFT is done by means of the following steps: 1D DFT of each row; transpose; 1D DFTs of each row (which were columns before the transpose); then—second transpose, which makes the DFT array orientation to correspond the spatial one. The 2D DFTs used in Claims 4 and 5 are reduced so as the said second transpose step is omitted. It is redundant and not required for correct implementation of this invention.

Inversion—is similar to the image re-arrangement commonly known as Reflection, or Flipping, resulting in the image data being stored upside down, or mirrored left-to-right. In this invention the term has a slightly different meaning that is, however, quite standard in Fourier analysis: inverted rows, for example, do get stored upside-down, all except the Row(0), which stays put untouched; and likewise—the inverted columns.

Shear Inversion—is an original technique designed to perform fine shearing without the conventional 2D DFTs. It doubles the shear angle, as compared to a single Levelling step. Its basic idea is—to:
level the rows;
invert—either columns or preferably rows (rows is simpler!);
un-level the rows again, so that the 1D DFT be able to process it.
With frequency rows inverted, it is advantageous at this point to apply the inverse 1D DFT with the same exponential term sign as was used in the forward 1D DFT. This restores the spatial data with inverted rows (not columns), which again is simpler to process.

Centered Inversion—is a shortcut implementation of the Shear Inversion. One can perform, or rather explain, e.g. the "centered row" inversion with two additional virtual 1D cyclic shifts, so that the first one moves the F(0) into the middle of the Row(0); then—the normal row inversion is performed; then F(0) is shifted back to origin. In practice, however, it is quite easy to modify the inversion routine so that it achieves the centered row inversion without actually doing the two shifts.

Symmetry: There is a natural symmetry in most, perhaps all, of the special operations described above. In particular, most of the permutation operations are symmetrical, i.e. their forward and reverse versions are identical. This means they somewhat belong to the class of fundamentals such as e.g. Transpose, Reflection, Negation, etc. It also means that running the same operation twice restores the original data (this helps with testing a lot!) The fully symmetrical operations are: double-shear transpose, centered transpose, row and column inversions, centered row inversion. The Levelling and its reverse are obviously lacking that kind, but still there is another: for an array with N rows—repeat Levelling N times, and this also restores the data.

Another example: two arrays obtained by centered row and centered column inversion—are 1D inversions of each other. This is put to use in the Shear Inversion, when the inverse 1D DFT has the same exponential term sign as the forward one.

DETAILED DESCRIPTION OF THE INVENTION

In accordance with the first aspect of the present invention, there is provided a method for simultaneous two-axial shearing (i.e. elliptical rotation) of 2D images, the method comprising of steps:
1. computing a single 1D DFT of a 2D image data array;
2. performing a permutation whose outcome is identical to the centered transpose (achieved by: a centering 1D cyclic shift, a transpose, and the un-centering shift);
3. computing a single inverse 1D DFT of the 2D array.

The method produces a transposed array of the rotated image, pivoted at the point corresponding to the Fourier F(0) element. On square images of width W, rotation is circular and its angle is equal to arctan(1/W). On oblong images of (W×H) layout, rotation is elliptical, with the angle varying non-isotropically between arctan(1/W) and arctan(1/H).

The method has dependent claims for:
1. Producing rotations around an arbitrary Pivot point within the image.—The method further comprising steps of: Pivot-to-F(0) shift in the beginning, and a reverse shift at the end.
2. Controlling the Direction (CW or CCW).—The method further comprising a transpose step performed either last or first of all.

In accordance with the second aspect of the present invention, there is provided a method for shearing the 2D images or parts thereof, yielding the angle of arctan(1/width), the method comprising of steps:
1. computing a single 1D DFT of the 2D image data array;
2. performing 2D cyclic shifts (called herein Levelling) by 1 unit up of the columns whose row index's fractional part is equal to or greater than 0.5;
3. computing an inverse 2D DFT, reduced so as to have its second transpose step omitted.

The method produces a vertical (up/downward) shear pivoted at Column(0). The method has its reverse (both order and nature) sequence of steps, producing the opposite shear angle.

In accordance with the third aspect of the present invention, there is provided a method for shearing the 2D images or parts thereof, yielding the angle of arctan(2/width), the method comprising of steps:
1. computing a single 1D DFT of the 2D image data array;
2. performing either a Centered Column or preferably a Centered Row inversion;
3. computing a single inverse 1D DFT.

The method produces a vertical shear pivoted at Column(0), with either columns or preferably rows inverted. The method has a dependent claim for further inverting the rows/columns, thus controlling the shear direction (up/down).

The two shearing methods above—are the core techniques for fine (sub-pixel) shearing. They both have dependent claims for:

1. Applying the coarse shear adjustment.—The method further comprising a 1D cyclic shift by a number of rows up or down, performed either last or first of all.
2. Obtaining the shear around an arbitrary pivot point within the image.—The method further comprising steps of: Pivot-to-Column(0) shift in the beginning, and a reverse shift at the end.
3. Producing a horizontal (right/leftward) shear pivoted at Row(0).—The method further comprising two transpose steps: one—in the beginning, and one at the end.

The dependent fine-shearing methods above—form the basis for compound shearing techniques, yielding the angles of arctan(N/width), or arctan(2N/width), having dependent claims for:
1. Compound vertical shearing.—The method comprising steps of: dividing the image into vertical strips; shearing each strip separately, assembling (pasting) the strips back.
2. Compound horizontal shearing.—The method comprising steps of: delimiting within the image a number of horizontal strips; shearing each strip separately, in place.

The dependent compound shearing methods above—form the basis for compound rotation techniques, having dependent claims for:
1. Two-stage (2-shear) rotation.—The method comprising steps of: shearing the image by arctan(N/width); transpose; shearing the image by arctan(−N/height). And further—another transpose performed either last or first of all, thus controlling the direction (cw/ccw).
2. Three-stage (3-shear) rotation.—The method comprising steps of: shearing the image by arctan(N/width); transpose; shearing the image by arctan(−2N/height); transpose; shearing the image by arctan(N/width).

Advantageous Effects

The present invention has been an exciting, pioneering exploit into uncharted nooks beyond the traditional orthogonal Fourier analysis, and into the higher spheres of De Circuli Quadratura (squaring the circle). As we know it, the Fourier sines and cosines—are rotation functions. Yet, until now the task of rotating the Fourier transforms (or the images themselves) was somewhat tedious, arbitrary, imprecise, or . . . still tediously convoluted. Well, until now. In plain tongue, the present invention allows to rotate a square inside the square, that is—it rotates a square inside itself, plus, does it losslessly.

From a visual artist's point of view, a random Fourier-rotated image, especially when animated, may not look aesthetically perfect: suddenly they begin to observe "artefacts" resembling the optical diffraction patterns and transient ripples, coming from "nowhere". Actually, this is normal: both patterns and ripples are telltales of the phenomenon—of proper Fourier interpolations. When there are too much of flat "surfaces" (colors), or too high the contrast (the worst case: black and white text)—the higher the intensity of those ripples (for it is not easy to compose a length of straight line out of sine waves). Turning the perceived disadvantage into advantage, one could say that the present invention allows, perhaps for the first time, to observe the Fourier rotation ripples, and also to measure both the ripples and the value of how well sampled the image is.

Apart from image dimensions, the invention (Claims 1-3) does not utilize any arbitrary parameters. Combined with its extreme simplicity, it exhibits the features necessary (and hopefully—sufficient) for it to become a kind of benchmark tool in the digital rotation science. There are branches of image analysis that depend heavily on Fourier transforms and algorithms, such as: the surface texture measurements, low/high pass filters, the masking, windowing, convolution techniques, digital watermarking, JPEG-like compression etc. The present invention can become a useful tool for testing and further perfecting of those algorithms.

DESCRIPTION OF DRAWINGS

Basically, the present invention employs only DFTs (including FFTs) and permutations. There are volumes of literature describing the orthogonal Fourier workings. It would not be a hindrance to consider e.g. a 1D FFT routine as a "black box" function, which converts, in place, a "spatial line" of say 8 complex numbers ABCDEFGH into a "frequency line" of different 8 complex numbers, designated as say abcdefgh. Important thing is to know that Fourier F(0) is conventionally at the origin, i.e. f(0)=A, F(0)=a, and "A" should not change after rotation. The drawings herein follow these conventions, and focus attention onto the permutations that deliver the desired outcome. For a deeper understanding, the image arrays are often shown in both 1D and 2D forms. In addition, the 1D array representation uses dots to delimit the rows, e.g. ABCD.EFGH.IJKL for a (4×3) array. The frequency values (abcd, . . . ) are never changed by the present method, only swapped or shifted, i.e. permutated. The spatial values (BCD, . . . ) do get altered, namely sheared or rotated, and drawings reflect the change in italics (*BCD*, . . . )

This leads to the conclusion that even in 1D case it is natural to adopt the notion of the spatial rows to correspond to frequency columns. This phenomenon does also express itself in the FFTs: index reversal in 2D is equivalent to transposition. It also occurs in the single 1D DFT yielding the transposed 2D DFT array.

Figure 1:
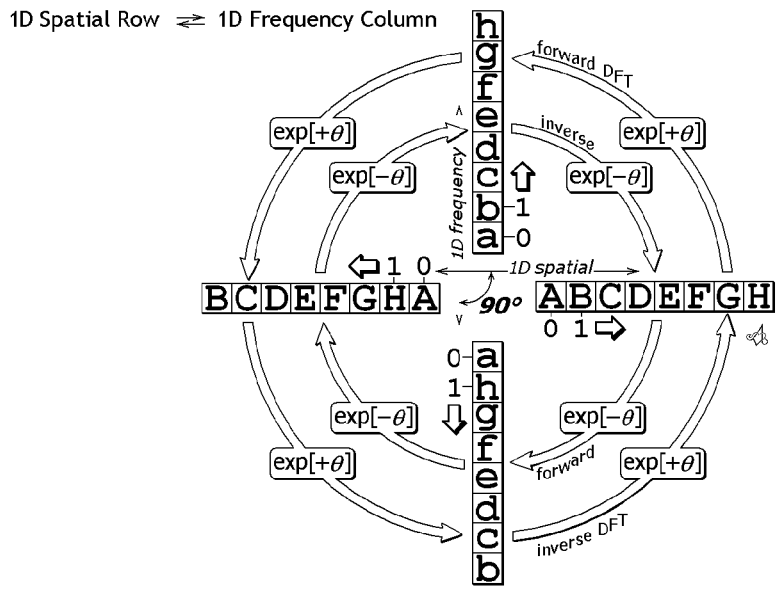
FIG. 1 explains responsibility of the Fourier exponential term sign. Basically, it controls whether we get our frequency data one way (say, the frequency axis pointing up) or the other—inverted (axis—down). Visually, this is possible only if:
the frequency axis is orthogonal to the spatial axis, which they are;
the Fourier transform "rotates" the axis by 90 degrees; and
the exponential term sign is just setting the direction (+90° or −90°.
Figure 2:
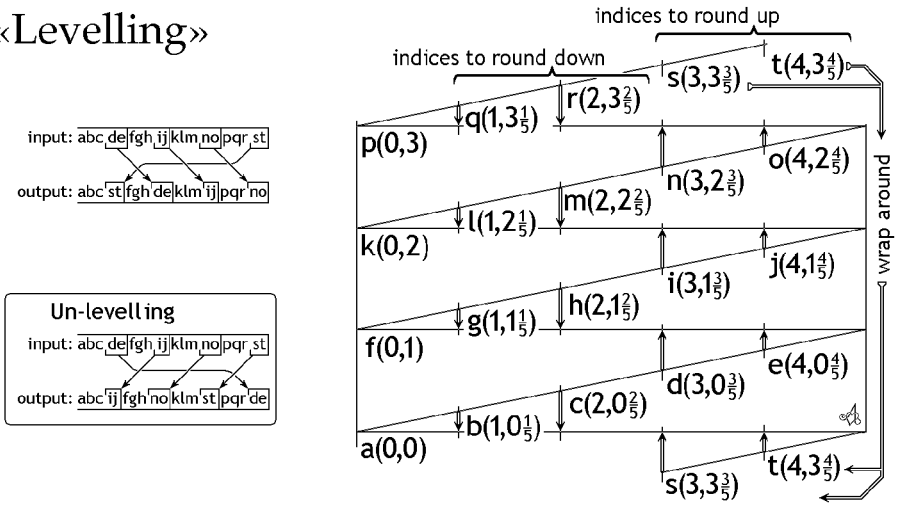

FIG. 2 depicts the skewed frequency grid produced by the single 1D DFT, and rationale and geometry of the Levelling shifts, producing the arctan(1/width) shears.

Figure 3:
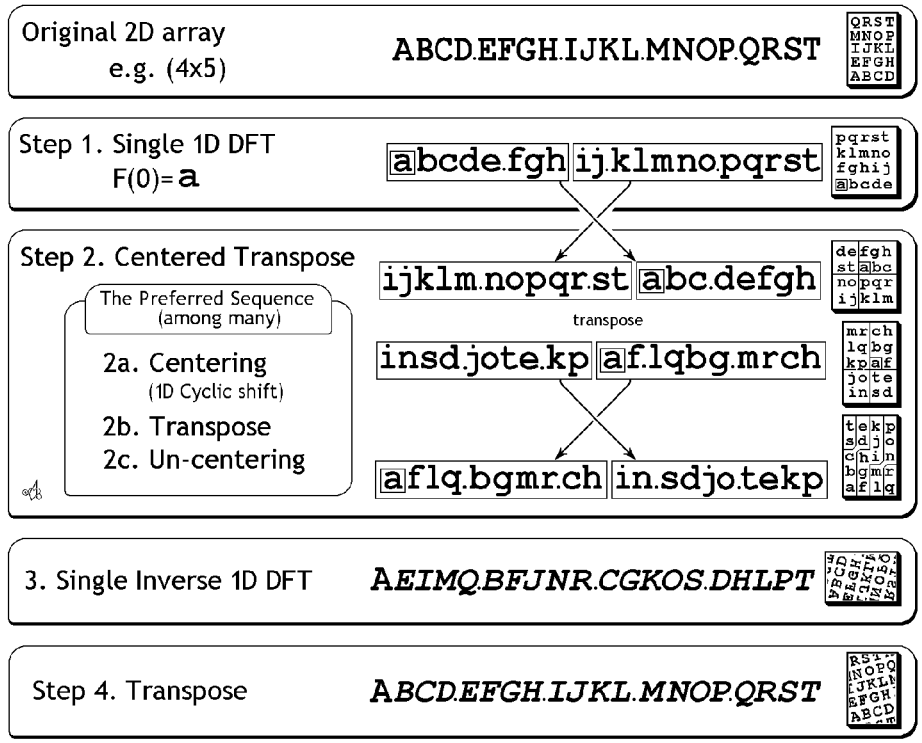

FIG. 3 is a flowchart of the first main type of the present invention methods, yielding the straight-forward image rotation by applying two small shears, vertical and horizontal, simultaneously.

Figure 4:
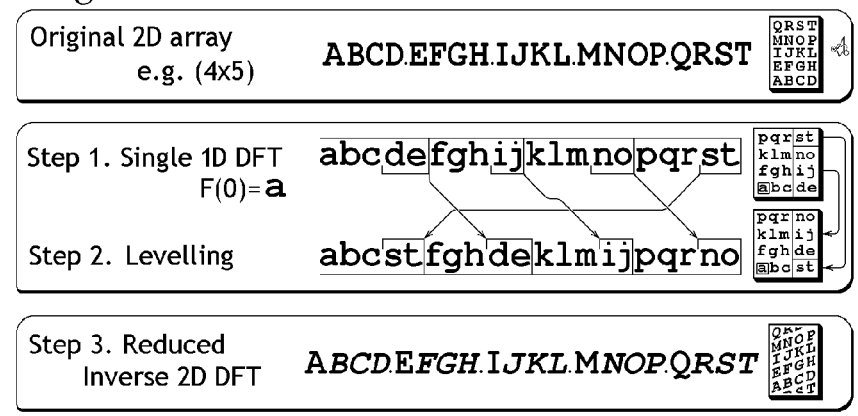

FIG. 4 is a flowchart of the second main technique, achieving the fine sub-pixel shearing by arctan(1/width), and using both one single 1D DFT and the reduced 2D DFT.

Figure 5:
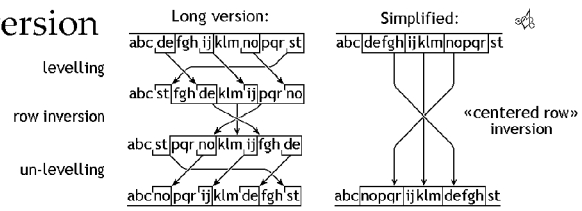

FIG. 5 is a flowchart of the Shear Inversion technique, explaining its being equivalent to the "Centered Row" inversion.

Figure 6:
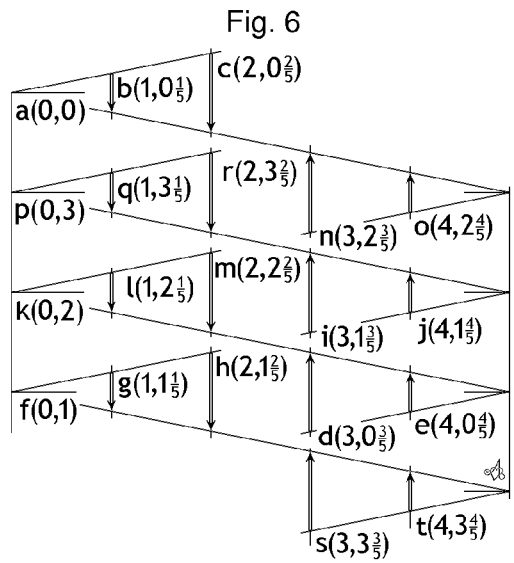

FIG. 6 depicts the rationale and geometry of the "Centered Row" Inversion, producing the arctan(2/width) shears.

Figure 7:
Figure 7:
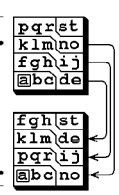
Figure 7:
Figure 7:
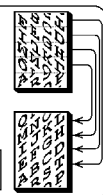
Figure 7:

FIG. 7 is a flowchart of the third main technique, yielding the fine sub-pixel shearing by arctan(2/width), and using only two single 1D DFTs.

Figure 8:
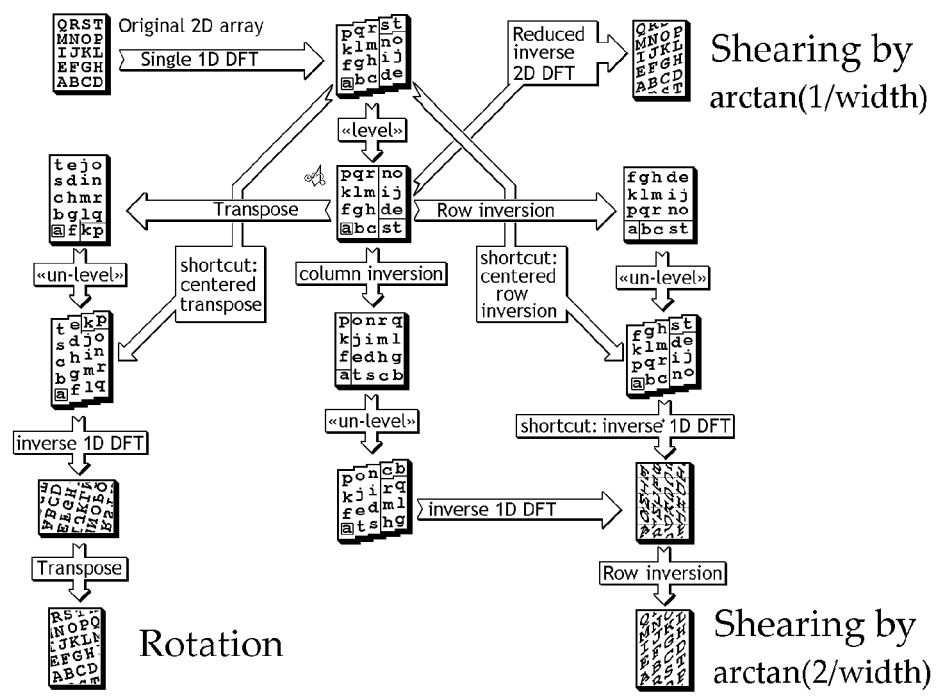

FIG. 8 depicts the three main techniques united, originating from the same point, and branching out whence the skewed frequency rows become levelled.

INDUSTRIAL APPLICABILITY

Microprocessor consumer electronics: personal computers, digital television, digital cameras, mobile phones.

Scientific calculations: medical imaging, geological imaging, crystallography, weather forecasting, visual cryptography, generic image processing and analysis.

Entertainment industry: special visual effects, shape morphing, animation, computer games.

CITATION LIST

1. U.S. Pat. No. 6,097,855 August 2000, Levien
2. U.S. Pat. No. 6,640,018 October 2003, Thesen
3. U.S. Pat. No. 6,687,422 February 2004, Chen et al.
4. <<*Algorithm for Rotating an Image by Shearing*>>, IBM Technical Disclosure Bulletin, vol. 31, No. 2, July 1988, pp. 389-391.
5. <<*Convolution-based interpolation for fast, high-quality rotation of images*>>, Unser at al. IEEE Transactions on Image Processing, vol. 4, No. 10, October 1995, pp. 1371-1381.
6. <<*Multi-dimensional properties of One-dimensional discrete Fourier transform*>>, Batrac A V, http://arxiv.org/abs/math/0301017
7. Batraction.exe—demonstration program, circa 100 kB, http://users.tpg.com.au/batrac/DFT/

The invention claimed is:

1. A method for shearing two-dimensional (2D) data arrays (including digital images) or parts thereof, comprising the steps of: a) computing a single one-dimensional (1D) discrete Fourier transform (DFT) of a 2D array (called hereinafter Batrac transform); b) performing a permutation whose outcome is identical to a (so called hereafter) centered transpose, achieved by: b1) a centering 1D cyclic shift of the whole DFT array, shifting Fourier F(0) datum from original location to the array's 2D geometrical center; b2) a row-column transpose; b3) an un-centering 1D cyclic shift of the whole 2D array, shifting F(0) from array's center back to original location; c) computing an inverse Batrac transform.

2. The method of claim 1 further comprising two 1D cyclic shifts of the whole 2D array: a forward one—moving an arbitrarily chosen pivot datum over to the Fourier F(0) location, performed first of all; a reverse shift from F(0) to pivot's transposed original location) at the end.

3. The method of claim 1, wherein the step (b1) is—performing 2D cyclic shifts (to be known herein as Levelling) by 1 unit up, of DFT data within each column in the array's right side half (the right side being hereinafter meaning—with the higher values of column indices); and the step (b3) is—performing 2D cyclic shifts (to be known herein as Un-levelling) by 1 unit down, of DFT data within each column in the array's right side half.

4. The method of claim 3 wherein Steps (b2) and (b3) get omitted and Step (c) is—computing a reduced version of a conventionally computed inverse 2D DFT, wherein a usually performed second row-column transposition step is omitted.

5. The method of claim 3, wherein Steps (b1) and (b2) get omitted and Step (a) is—computing a reduced version of a conventionally computed forward 2D DFT, wherein a usually performed second row-column transposition step is omitted.

6. The method of claim 1, wherein the step (b2) is an inversion of either columns or preferably rows, and the step (c) is a forward Batrac transform.

7. The method of claim 6 further comprising an inversion of either columns or preferably rows, performed either last or first of all, thus controlling the shear direction.

8. The method of claim 7 further comprising a 1D cyclic shift of the whole 2D array, by twofold of a number (hereafter to be called coarse shear) of row lengths up or down, performed either last or first of all.

9. The method of claim 8 further comprising two 1D cyclic shifts of the whole 2D array: a forward one—shifting an arbitrarily chosen pivot datum into column(0), performed first of all; and a reverse shift at the end.

10. The method of claim 9 further comprising two transpose operations: one in the beginning; and one at the end.

11. A method for shearing 2D data arrays (including digital images), comprising the steps of: a) dividing the array into a number of vertical strips of equal widths; b) shearing each strip as in claim 9, either sequentially or in parallel on a multi-core processor, with the said coarse shear value being equal to the strip ordinal number; c) re-assembling the strips back into the array.

12. A method for shearing 2D data arrays (including digital images), comprising the steps of: a) delimiting within the array a number of horizontal strips of equal heights; b) shearing each strip in place as in claim 10, either sequentially or in parallel on a multi-core processor, with the said coarse shear value being equal to the strip ordinal number.

13. A method for rotating 2D data arrays (including digital images), comprising the steps of: a) shearing as in claim 12; b) transposing;
   c) shearing as in the said step (a), but in the opposite direction.

14. The method of claim 13 further comprising a transpose, performed either last or first of all, thus controlling the rotation direction.

15. A method for rotating 2D data arrays, comprising the steps of: a) shearing as in claim 12; b) transposing; c) shearing as in the said step (a) but in the opposite direction, and with the shear tangent value being double that in the said step (a); d) transposing; e) shearing as in the said step (a).

16. The method of claim 1 further comprising a row-column transpose, performed either last or first of all, thus controlling the shear direction.

17. The method of claim 16 further comprising two 1D cyclic shifts of the whole 2D array: a forward one, moving an arbitrarily chosen pivot datum over to Fourier F(0) location, performed first of all; a reverse shift (from F(0) to pivot's original location) at the end.

* * * * *